July 23, 1946.    H. H. HANSEN    2,404,632
ELECTRIC RESISTANCE WELDING APPARATUS
Filed Dec. 31, 1943    2 Sheets-Sheet 1
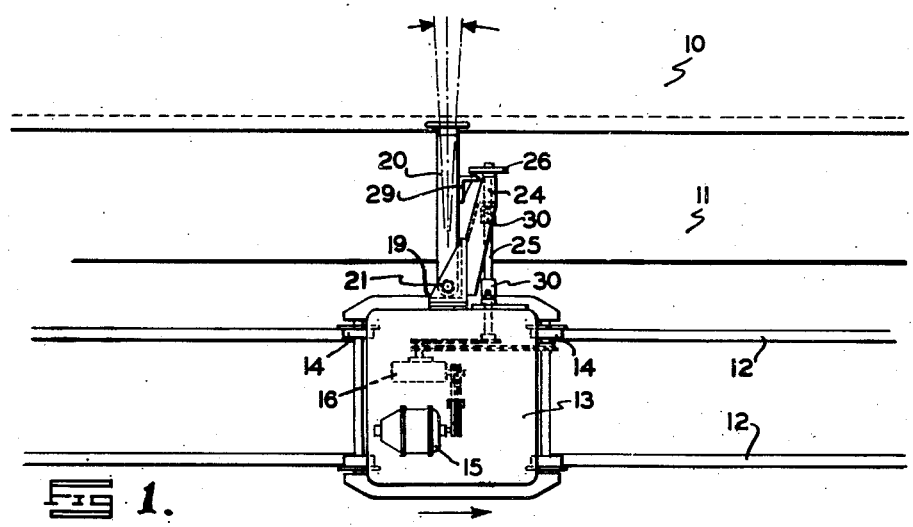
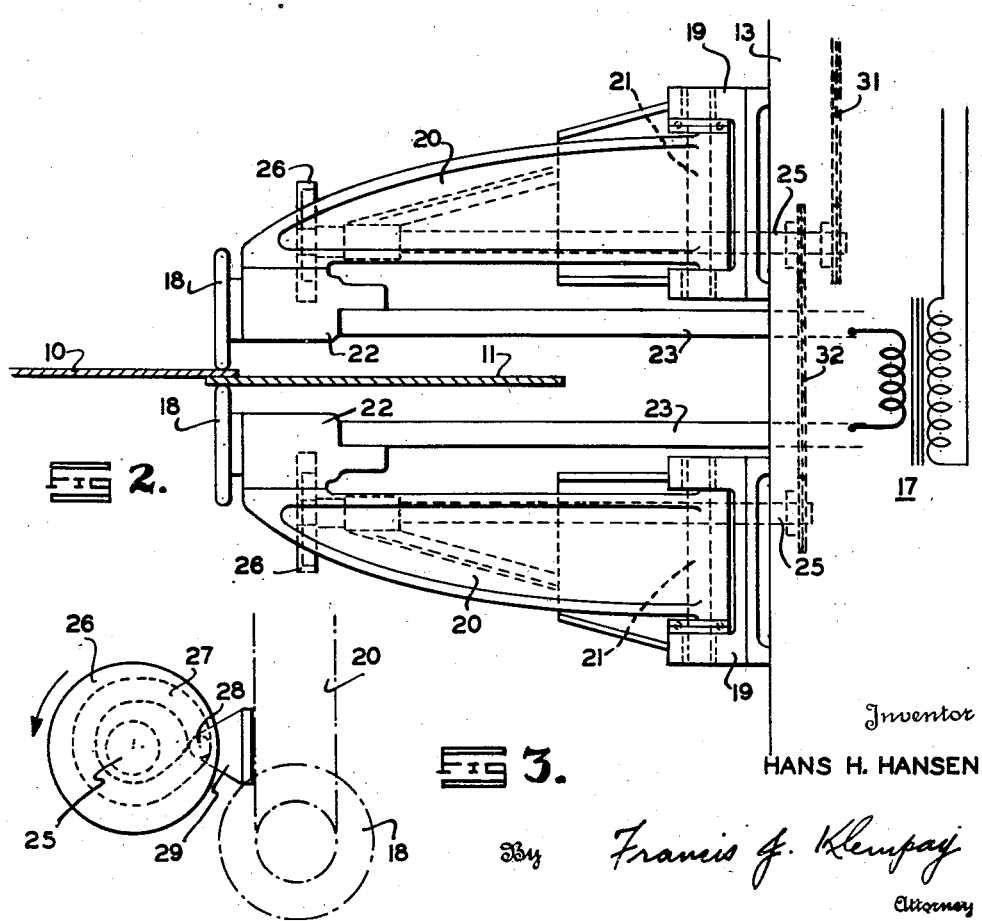
Inventor
HANS H. HANSEN
By Francis J. Klempay
Attorney

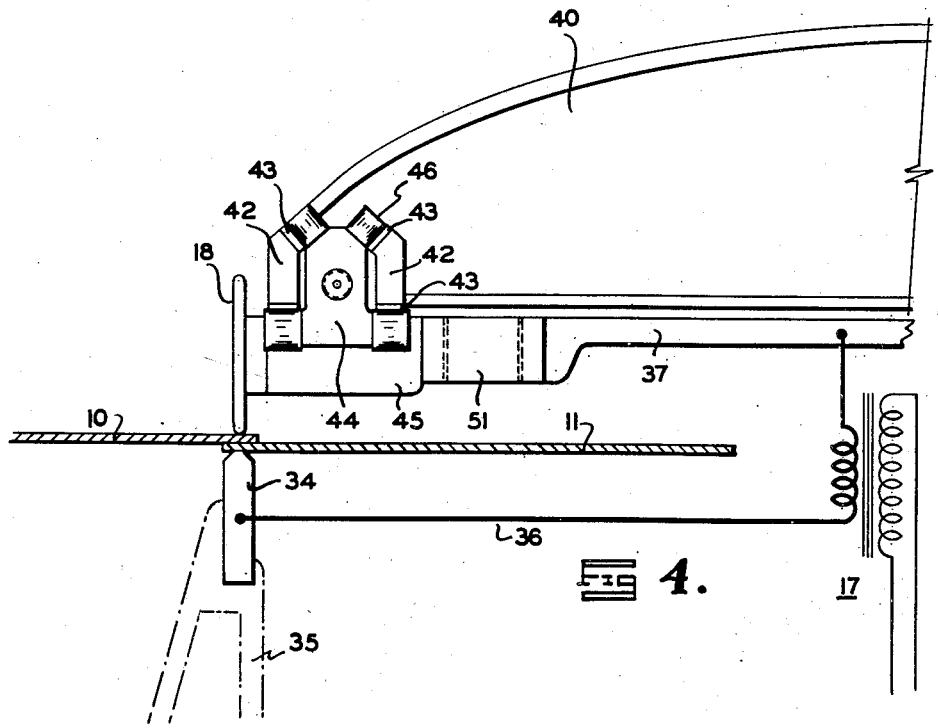
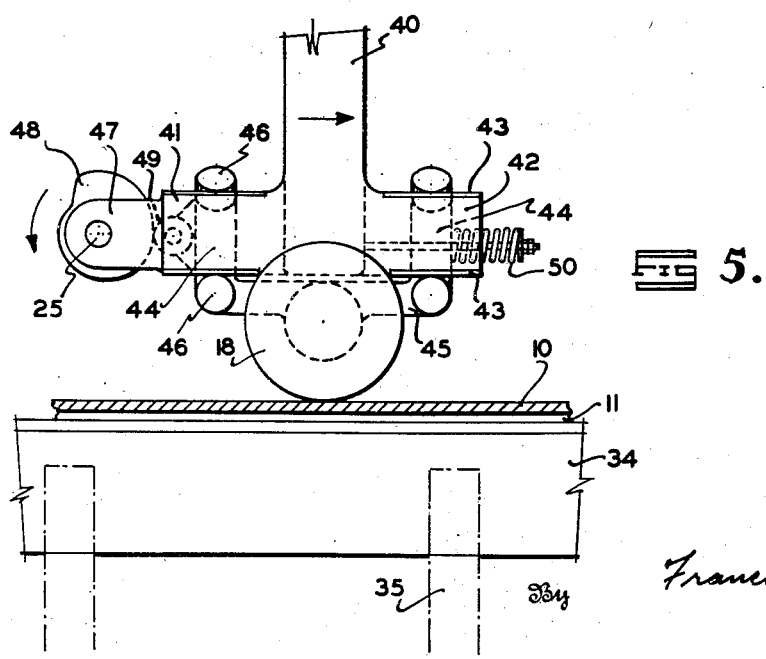
Inventor
HANS H. HANSEN

Patented July 23, 1946

2,404,632

UNITED STATES PATENT OFFICE 2,404,632

ELECTRIC RESISTANCE WELDING APPARATUS

Hans H. Hansen, Warren, Ohio, assignor to The Taylor-Winfield Corporation, Warren, Ohio, a corporation of Ohio Application December 31, 1943, Serial No. 516,397

15 Claims. (Cl. 219—4)

This invention relates to electric resistance seam welders and more particularly to welding machines of the general type in which a wheel electrode moves over the surface of the sheet or section to be welded for making spot welds at predetermined intervals along the line of weld.

In certain spot welding operations, as for example in the welding of certain aluminum alloys, it is necessary or desirable that welding electrode pressure be maintained at the point of weld for an appreciable length of time to effect resolidification of the metal of the weld nugget before removing the pressure therefrom. In this manner the formation of fissures is avoided and the weld is otherwise improved in physical character. This pressure dwell is very readily accomplished in conventional spot welders of the stud electrode type simply by providing in a separate sequencing circuit or as an inherent feature in the normal cycling control suitable provision for delaying the release of pressure from the welding electrode or electrodes a predetermined time interval following the application of the welding current. The problem is more difficult, however, in the case of spot welders of the roller electrode type in which it is desired to effect, in a rapid and expeditious manner, a multiplicity of spot welds uniformly spaced along a seam to be welded, i. e., the line of weld.

Heretofore, in providing for the electrode pressure dwell in roller spot welding as outlined above the common practice has been to drive the roller welding electrode and to employ in the line of drive an indexing device which gives an intermittent motion to the electrode thus providing for its stoppage during the flow of welding current and the necessary continued application of welding pressure. Normally a Geneva gear is employed to effect this mode of operation as will be understood. It should be obvious, however, that this mode of operation requires either the intermittent movement of the work to be welded or of the welding machine itself and because of the large mass and inertia of the latter the intermittent movement of the latter is wholly impractical particularly when it is desired to make a large number of spot welds in a rapid and economical manner. If the work is comparatively small and light the roller electrode drive may be employed to move and index the work with respect to the machine as will be understood but when the work is of such mass that the driven electrode cannot move and index it with the rapidity and accuracy required it becomes necessary to provide a separate support and moving means for the work which further complicates the assembly and which requires tremendous power to index the heavy masses at the high speeds.

The primary object of the present invention is the provision of an electric resistance welding assembly which is operative to effect spaced spot welds along the seam or line of weld in a rapid and economical manner while providing for any desired pressure dwell of the welding electrode at the respective welds and while utilizing simplified apparatus requiring a minimum of power for its operation. This is accomplished, primarily, by so constructing the welding machine that only the comparatively light roller electrode or electrodes employed and their immediately connected parts are provided with the required indexing or intermittent motion. By reason of this arrangement the comparatively heavy mass of the welding machine proper or of the work and/or its movable supporting and guiding structure (jigs, etc.) may be moved along the line of weld at uniform speed thus minimizing wear and tear on the parts of the complete assembly and reducing the power required to effect operation of the assembly. Inasmuch as the parts provided with intermittent or indexing motion are of comparatively small mass high speed operation may be readily attained even in connection with the welding of large sheets or sections.

A further object of the invention is the provision of improved arrangements for supporting the roller electrode in an electric resistance roller spot welding machine.

The above and other objects and advantages of the invention will become apparent upon consideration of the following detailed specification and the accompanying drawings wherein there is specifically disclosed certain preferred embodiments of the invention.

Referring to the drawings:

Figure 1 is a plan view of an electric resistance welding apparatus constructed in accordance with the principles of the invention;

Figure 2 is an end view of a portion of the apparatus of Figure 1;

Figure 3 is a fragmentary view of a detail of the apparatus of Figure 1; and

Figures 4 and 5 are fragmentary end and side views, respectively, of a modified assembly constructed in accordance with the principles of the invention.

Referring to Figure 1, reference numeral 10 indicates a longitudinally extending sheet of metal which is to be welded along its side edge to a second strip of metal 11. It should be understood, of course, that the work pieces 10 and 11 may, in actual practice, assume widely different forms and shapes and that suitable means, not shown, may be employed to support these work pieces and to retain them in proper relative positions for welding. Extending parallel with the desired line of weld is a track 12 or other suitable support for mounting the principal housing or frame 13 of the welding machine proper. Housing 13 is mounted for movement along the track 12 by means of any suitable expedient as, for example, the flanged wheels 14. To provide for the moving of the housing 13 along the track 11 certain of the wheels 14 may be geared to a driving motor 15 through a suitable speed reducing mechanism 16.

In accordance with usual practice the housing 13 carries the welding transformer, herein shown schematically at 17, and the control device, not shown, normally associated with electric resistance welding machines. In the machine of Figures 1, 2 and 3 two wheel or roller welding electrodes 18 are provided to engage the opposite surfaces of the work pieces to be welded together and these electrodes are supported from the housing 13 and moved in relation thereto by the apparatus now to be described.

Secured to and extending outwardly from the side of the housing 13 adjacent the position of the work pieces is a pair of vertically spaced brackets 19 to each of which is pivotally connected an outwardly extending arm 20 for pivotal movement about the vertically extending and aligned hinge pins 21. Rigidly secured to the outer end portions of the arms 20 and positioned within the throat between these arms are the current conductive blocks 22 in which are journaled the supporting shafts or hubs of the roller electrodes 18. Connected to the blocks 22 and extending into the housing 13 for connection with the terminals of the secondary of the transformer 17 are the current conducting bars or straps 23 which have sufficient flexibility to allow limited pivotal movement of the arms 20 about the pins 21.

Secured to each of the brackets 19 and extending outwardly from the housing 13 generally along the arms 20 is a support 24 in which is journalled the outer end portion of a drive shaft 25. To the outer end of each of the shafts 25 is keyed a cam 26 having in its inner face a groove 27 of predetermined peripheral contour and extending into the groove 27 is a cam following pin 28 carried by a bracket 29 which is rigidly secured to the adjacent arm 20. Interposed in each of the shafts 25 is a pair of spaced flexible couplings 30 and both the shafts 25 are arranged to be simultaneously driven by a chain 31 leading from the output shaft of the transmission 16, the two shafts 25 being coupled together by any suitable expedient as, for example, the chain 32. In actual practice one or both of the brackets 19 has vertical sliding connection with respect to the housing 13 whereby adjustment may be made for thickness of the stock between the roller electrodes 18 and suitable welding pressure applied between these electrodes as will be understood.

As explained above the welding machine is arranged to move along the track 12 at a constant speed under power derived from the energized motor 15. As the machine moves forward at a fixed rate the shafts 25 will be simultaneously rotated at a more or less fixed speed by reason of the common drive through gear box 16 and as the same cams 26 rotate the arms 20 and consequently the electrodes 18 will swing in horizontal planes about the pivots 21 through a time position pattern discernible from the peripheral shape of the cam groove shown in Figure 3. Referring to Figure 1—as the machine proper 13 moves at constant speed in the direction indicated in Figure 1, and the cam 26 moves in the direction indicated in Figure 3, it is apparent that for the first approximate 90° of the cam movement the arm 20 with the welding wheel 18 moves in relation to the machine 13 rapidly to the right as viewed in Figure 1, and as the cam 26 moves the next approximate 270° to complete the cycle, the arm 20 with the welding wheel 18 moves, in relation to the machine 13, to the left as viewed in Figure 1, at a constant speed which must be exactly the same speed at which the machine 13 moves to the right, which in effect makes the welding wheel stand still in relation to sheets 10 and 11. During this latter time interval, approximately 75% of the cyclic time interval, the weld is made.

It is apparent from the above that for each particular spot spacing there will be a particular cam 26 and a particular set of change gears in box 16 to give the welding machine 13 a corresponding constant speed.

It should be understood that suitable synchronous means, not shown, is employed to initiate the flow of welding current immediately upon the steep portion of the cam being passed and the consequent stoppage of the electrode with respect to the work. Also, suitable synchronous and/or timed means may, if desired, be employed to effect a change in the welding pressure applied at any time during the periods when the electrode is stopped with respect to the work.

The two arms 20 of the machine described above move in unison, of course, so that the top electrode follows the bottom electrode or vice versa. While in the assembly described above the welding machine proper is moved relative to the work the general system employed would be equally as effective if the welding machine proper were stationary and the work moved relative thereto. In this embodiment the work and, of course, the supports, clamps, etc., which move with it may again be moved at a fixed speed, the cams 26 again providing for the stoppage of the welding electrodes relative to the work.

In the modified arrangement of the apparatus of the invention shown in Figures 4 and 5 the lower welding wheel 18 is replaced by a fixed electrode 34 which is rigidly mounted in a frame 35 and which extends parallel with the direction of travel of the welding machine proper which mounts the arm 40. The elongated fixed electrode 34 is grounded to one terminal of the secondary of the welding transformer 17 through a suitable conductive path 36 while the other terminal of the secondary is connected to a conductive bar 37. It will be understood that the electrode 34 may be built into and form a part of the supporting and restraining structure provided for the work pieces to be welded. Also, the electrode 34 may be curved in a longitudinal direction and in either horizontal or vertical planes as desired provided that the path of travel of the machine or frame supporting the arm 40 is generally parallel thereto.

In the modification illustrated by Figures 4 and 5 the arm 40 need not have pivotal movement in a horizontal plane with respect to the frame or machine mounting it although it should have vertical sliding movement or pivotal movement in a vertical plane with respect thereto to provide for the application of the welding pressure and for variations in thickness of the stock being welded as will be understood. The outer end of arm 40 is provided with front and rear projections 41 and 42, respectively, which mount quadrilaterally arranged tracks 43. Extending between the two halves of each of the projections 41 and 42 is the integral end block 44 of a carriage 45 which is current conductive and rotatably mounts the welding wheel 18. Each of the end blocks 44 of the carriage 45 mounts four rollers 46 which engage the tracks 43 thus providing for the sliding movement of the carrier 45 relative to the arm 40 in a direction parallel with the fixed electrode 34.

Extending outwardly from each half of the projection 41 is an ear 47 and positioned between the two spaced ears thus provided is a cam 48 which is keyed to the shaft 25 journaled in the ears 47. On the adjacent end block 44 of the carrier 45 is journaled a cam following roller 49 which is arranged to engage and follow the outer peripheral surface of the cam 48. A spring 50 tends to move the slide 45 to the left as viewed in Figure 5 to maintain the follower 49 in contact with the cam 48. It should be apparent that by properly designing the cam 48 and rotating it through shaft 25 at proper speed and simultaneously with movement of the welding machine including arm 40 the pattern of movement of the roller electrode 18 with respect to the work will be similar to that described in connection with the embodiment of Figures 1, 2 and 3. Thus while the arm 40 moves at constant speed the wheel 18 will lag behind thereby remaining fixed with respect to the work a major part of the whole time of a cycle of operation and will thereafter move ahead very rapidly to again take up its at-rest position. As in the embodiment first described suitable synchronous and/or timed means will in practice be employed to control the application of welding current and change of welding pressure if desired during the succeeding cycles of operation. Current is conducted to the carrier 45 and thus to the electrode 18 from the bar 37 through a flexible looped current conducting band 51. The welding wheel indexing arrangement of Figures 4 and 5 may, of course, be employed in duplicate in the manner of Figures 1 and 2 and, when so employed either the machine or the work may be moved in the manner explained above in connection with the first described embodiment.

It should now be apparent that I have provided an improved resistance welding arrangement having particular utility in the welding of seams consisting of spaced individual spot welds which accomplishes the objects initially set out. By the use of my invention I am enabled to effect satisfactory welding of this type in work pieces of small or large extent and mass at high speeds and with a minimum of power consumption as well as with a minimum of destructive shock and wear of the respective parts of the welding assembly. The only mechanical parts of the assembly requiring rapid acceleration are comparatively light thereby keeping the power required for the operation of the assembly at a minimum.

The above specifically described embodiments of the invention should be considered as illustrative only as obviously many changes may be made therein without departing from the spirit or scope of the invention. Reference should therefore be had to the appended claims in determining the scope of the invention.

What I claim is:

1. Electric resistance welding apparatus comprising a supporting structure carrying the welding transformer and having a welding electrode mounting arm extending outwardly therefrom; the combination of means to effect relative movement between the work pieces to be welded and said structure along a path parallel with the desired line of weld, a roller electrode rotatably mounted on said arm and having electrical connection with the secondary of said transformer, the means mounting said electrode on said arm comprising a slideable connection whereby said electrode may be moved along the line of weld independently of relative movement between the work and arm, and means operable synchronously with said means to effect to move said electrode relative to said arm according to a predetermined time-position pattern whereby said electrode may have intermittent movement with respect to the work while said arm is continuously moving with respect to the work.

2. Apparatus according to claim 1 further characterized in that said means to move said electrode relative to said arm comprises a patterned cam arranged to be moved in synchronism with the relative movement between said work and machine, said cam having a steep rising portion followed by a gradual receding portion whereby during relative movement of said work and machine said electrode is caused to move through a cycle of movement consisting of a rapid advance motion followed by a gradual receding motion with respect to said arm so that said electrode remains stationary with respect to the work during a substantial portion of each cycle of operation.

3. In electric resistance welding apparatus an arm adapted to have relative movement with respect to the work pieces to be welded and in a direction parallel with the line of weld, a current carrying block slideably mounted on said arm for reciprocating movement along a path generally parallel with said line of weld, a roller electrode journaled in said block, and means to reciprocate said block with respect to said arm, said means to reciprocate comprising means to move said block during its return stroke at substantially less speed than the speed of the forward stroke imparted to said block.

4. In electric resistance welding apparatus for effecting a multiplicity of spot welds spaced longitudinally along the line of weld the combination of a support mounting the welding transformer, means to effect relative movement between the work pieces to be welded and said support in a direction parallel with said line of weld, an arm pivotally mounted on said support for movement in a plane parallel to and vertically spaced from said line of weld, a roller welding electrode journaled in the outer end of said arm, and means operable synchronously with said means to effect to move said arm about said pivotal connection during relative movement of said work and support and according to a predetermined time-position pattern whereby said electrode has intermittent movement with respect to the work while said support has continuous movement with respect thereto.

5. Apparatus according to claim 4 further characterized in that said means to move comprises a cam mounted for rotation about an axis normally fixed with respect to said support, and a cam follower on said arm outwardly of said pivotal connection and having operative connection with said cam.

6. Apparatus according to claim 4 further characterized in that said means to effect relative movement between said work and said support comprises a supporting track extending parallel with the line of weld and means mounting said support for movement along said track, means to move said support along said track, and means coupled with said last mentioned means to effect oscillation of said arm synchronously with movement of said support.

7. Electric resistance welding apparatus comprising in combination a support adapted to have relative movement with respect to the work pieces to be welded in a direction parallel with the desired line of weld, an arm pivotally mounted on said support and carrying a current conducting block at its outer free end, a roller welding electrode journaled in said block, means to conduct welding current to said block, and means to oscillate said arm about said pivotal connection whereby said electrode will move over the surface of a work piece to be welded and in contact therewith, said means to oscillate comprising a cam having a steep rising portion followed by a gradual receding portion whereby said roller electrode has a fast forward movement with respect to said support followed by a slow backward movement with respect to the said support so that said electrode is moved over said work in an intermittent manner with a substantial portion of the cycle of operation being consumed in holding said electrode stationary with respect to said work.

8. Electric resistance welding apparatus comprising in combination a welding transformer and support therefor and means to effect relative movement between the work to be welded and said support along the line of weld, a roller electrode electrically connected with the secondary of said transformer, said electrode being mounted on said support and adapted to have welding engagement with the work along the line of weld, the means mounting said electrode on said support being operative to provide relative movement between the electrode and the support back and forth along the line of weld, and means to move said electrode back and forth with respect to said support.

9. Apparatus according to claim 8 further characterized in that said means to move said electrode with respect to said support comprises means to move said electrode at high speed in a forward direction and at a low speed in the backward direction whereby upon relative uniform movement of said work and support the electrode will move intermittently with respect to the work.

10. Electric resistance welding apparatus comprising in combination a support adapted to have relative movement with respect to the work pieces to be welded in a direction parallel with the desired line of weld, a roller electrode carried by said support and adapted to have welding engagement with the work along the line of weld, the means mounting said electrode on said support being operative to provide relative movement between the electrode and the support along the line of weld, and means to move said electrode along said line and back and forth with respect to said support.

11. Apparatus according to claim 10 further characterized in that said means to move said electrode with respect to said support comprises means to move said electrode at high speed in a forward direction and at a low speed in the backward direction whereby upon relative uniform movement of said work and support the electrode will move intermittently with respect to the work.

12. Electric resistance welding apparatus comprising in combination a carrier mounting a pair of opposed roller welding electrodes, means to effect uniform relative movement between said carrier and the work to be welded along the desired line of weld, movable means mounting said electrodes on said carrier whereby the axes of rotation of said electrodes may be shifted back and forth with respect to said carrier and along the line of weld, and means to move said movable means back and forth.

13. Apparatus according to claim 12 further characterized in that said means to move said movable means is operative to impart high speed to the movement thereof in one direction with respect to said carrier and a lower speed in the other direction whereby said electrodes move intermittently with respect to the work while their opposed alignment is maintained.

14. Electric resistance welding apparatus comprising in combination a welding electrode adapted to have fixed engagement with the work to be welded, a roller welding electrode opposite said fixed electrode and adapted to clamp the work to be welded therebetween, a support for said roller electrode, means to effect uniform relative movement between said fixed electrode and said support along the line of weld, means mounting said roller electrode on said support operative to shift the axis of rotation of said roller electrode back and forth with respect to said support and along the line of weld, and means to move said electrode back and forth with respect to said support.

15. Apparatus according to claim 14 further characterized in that said last named means to move is operative during uniform relative movement between said fixed electrode and said support whereby said roller electrode moves with an intermittent motion with respect to said fixed electrode and work.

HANS H. HANSEN.